United States Patent

Cramwinckel

[15] 3,643,218

[45] Feb. 15, 1972

[54] CYCLIC GROUP PROCESSING WITH INTERNAL PRIORITY

[72] Inventor: Hans Cramwinckel, Beekbergen, Netherlands

[73] Assignee: U.S. Philips Corporation, New York, N.Y.

[22] Filed: Jan. 29, 1970

[21] Appl. No.: 6,833

[30] Foreign Application Priority Data

Feb. 1, 1969 Netherlands..........................6901657

[52] U.S. Cl...........................................................340/172.5
[51] Int. Cl...........................................................G06f 9/18
[58] Field of Search................................340/172.5; 235/157

[56] References Cited

UNITED STATES PATENTS

| | | | |
|---|---|---|---|
| 3,508,206 | 4/1970 | Norberg | 340/172.5 |
| 3,543,242 | 11/1970 | Adams et al. | 340/172.5 |
| 3,353,160 | 11/1967 | Lindquist | 340/172.5 |
| 3,377,579 | 4/1968 | Wissick et al. | 340/172.5 |
| 3,377,621 | 4/1968 | Hittel et al. | 340/172.5 |
| 3,395,394 | 7/1968 | Cottrlell | 340/172.5 |
| 3,398,296 | 8/1968 | Sarati et al. | 340/172.5 |
| 3,543,246 | 11/1970 | Adams | 340/172.5 |

*Primary Examiner*—Paul J. Henon
*Assistant Examiner*—Mark Edward Nusbaum
*Attorney*—Frank R. Trifari

[57] ABSTRACT

A priority circuit for passing in accordance with a given priority one of a plurality of interrogation signals coming from a number of lines to an output, said number of lines being divided in a number of different groups of lines, said circuit comprising means for dealing with interrogations within one group in accordance with a predetermined priority, there being provided means for processing cyclically the groups. The circuit comprises for this purpose a 1-out-of-($n$+2) position device in which $n$ is the number of lines of each group and the ($n$+1)th position is provided for activating the group by the preceding group, whilst the ($n$+2)th position is provided for setting the group into the rest position from a next following group (FIG. 3).

3 Claims, 4 Drawing Figures

Figure 1:
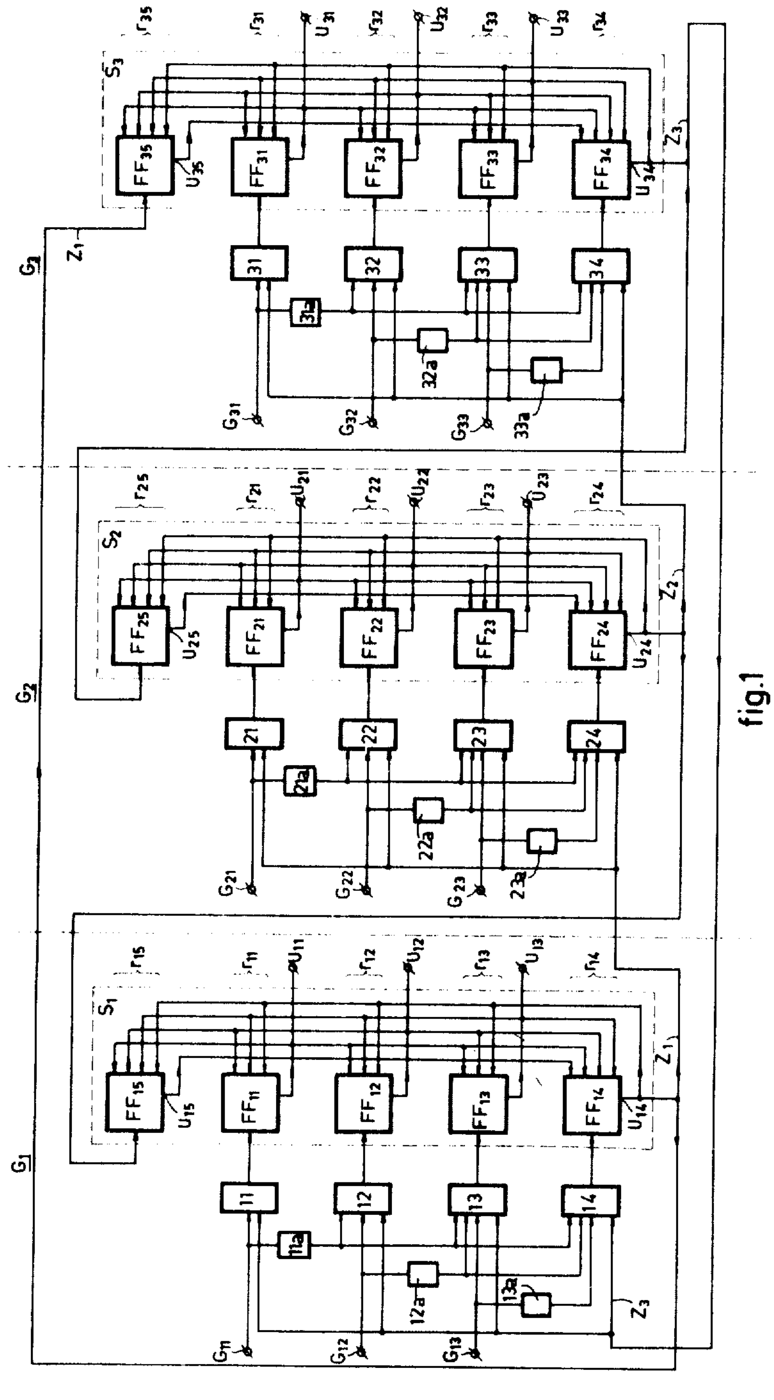

INVENTOR.
HANS CRAMWINCKEL

BY

AGENT

INVENTOR.
HANS CRAMWINCKEL

BY

AGENT

INVENTOR.
HANS · . CRAMWINCKEL

BY

AGENT

CYCLIC GROUP PROCESSING WITH INTERNAL PRIORITY

The invention relates to a priority circuit for transferring one of the signals coming through a plurality of lines in accordance with a given priority to an output, said number of lines being arranged in a number or different groups of lines, in which in each group each interrogation signal and the inverse values of the interrogation signals of high priority in the group concerned are applied to inputs of a logical (NOT)-AND gate, whilst in addition for activating a group an input of each of said logical (NOT)-AND gates in the group is connected to the output of the preceding group.

Such a priority circuit is known (U.S. Pat. Specification No. 3,353,160). The known priority circuit is appropriate for transferring, in accordance with a given priority, to a common output, one of the interrogation signals coming through a great number of lines, for which purpose the lines of the interrogation signals are arranged in a number of groups. Inside each group a given priority is fixed for each incoming line. By means of said (NOT)-AND gates the interrogation signal is transferred to the output of the group associated with the line having an interrogation signal and having the highest priority in the group. In this known arrangement said groups are arranged in a number of priority levels, the output of a group of a lower level being connected to an input of a group of the superjacent level. If an interrogation signal can be passed in a group of lower level, this is indicated from the group of the superjacent level for which purpose an input of each logical (NOT)-AND gate of the group of said lower level is connected to the relevant output of said group of the superjacent level.

An important problem involved in the known arrangement resides in that interrogations of the lowest or lower priorities will never or almost never have their turn. If constantly interrogations of higher priority are made, they are invariably dealt with in priority so that the other interrogation cannot come through. This may give rise to inadmissible waiting times for interrogations of lower priority. The invention has for its object to provide a priority circuit in which this disadvantage is obviated. The priority circuit according to the invention is characterized in that in order to obtain a priority circuit in which the groups are dealt with in cyclic order of succession whilst the priority in one group is maintained, each group is provided with an additional (NOT)-AND gate, one input of which is connected to said output of the preceding group and further inputs of which are connected to terminals where the inverses of the interrogation signals are available, whilst in one group the output of each (NOT)-AND gate is connected to an input of $(n+1)$ inputs of a 1-out-of-$(n+2)$ position device, wherein $n$ is the number of lines in one group, and for the adjustment of a rest position in which a group is blocked for interrogation signals the $(n+2)$th input of the 1-out-of-$(n+2)$ position device is connected to the output of the next-following group. In the priority circuit according to the invention it is ensured that the groups of lines for interrogation signals per group are always handled in cyclic order of succession. It should be noted that a cyclic handling of interrogations, for example, by a shift register in which the interrogations are dealt with in the order of entry is known. However, there is no splitting into groups, in which the lines have priority in each group. In the priority circuit according to the invention the priority of the lines relative to each other is maintained apart from the cyclic handling of the groups. In this manner the interrogations are dealt with from a starting moment in a first group in accordance with priority, after which the interrogations of a next group are dealt with. If there are none, the next following group is scanned etc., until the first group is again reached. It is thus ensured that also the groups remote from the first group are regularly checked for interrogations. In practice it may be imagined that in a computer system interrogations for magnetic tape apparatus are handled in accordance with a given priority schedule; a second group may be adapted to receive interrogations for information exchange with a chart reading apparatus and the like, whereas a third group is adapted to receive interrogations from the operator and the like. According to the present invention the operator may be sure that as soon as no interrogations for a magnetic tape is coming in and if the chart reading apparatus becomes operative at the presence of an interrogation, his interrogation will be dealt with after the interrogation in the group of chart reading apparatus is finished. An intermediate new interrogation for the magnetic tape apparatus is then not treated with priority. Only when the priority circuit has performed a cycle through all groups the first group is again checked. Apart from said example, many instances may be imagined in which such groups of interrogations have to be dealt with, for example, in communication systems.

It would be noted that in the circuit described both NOT-AND gates and AND gates may be employed, which is indicated herein by (NOT)-AND. Moreover, it should be noted that were NOT-AND gates may be used, NOT-OR gates may also be employed taking signal inversion into consideration, because as is known, from the book of Maley and Earle: "The logic design of transistor digital computers" 1963, pages 115 to 117, the NOT-AND and NOT-OR functions are dual ones.

The 1-out-of-$(n+2)$ position device may be formed by $(n+2)$ flip-flops, the setting inputs of which are connected to the outputs of said $(n+1)$ (NOT)-AND gates of the relevant group and to the said output of the next group, whilst the output of a flip-flop is connected to reset inputs of the other flip-flops in the group.

A very simple embodiment of the priority circuit according to the invention is obtained by having the 1-out-of-$(n+2)$ position device formed by a $(n+2)$ multiplet circuit having $(n+2)$ NOT-AND gates in series, the outputs of the NOT-AND gates, receiving the interrogation signals and the inverses thereof being connected to the inputs of the multiplet so that the multiplet takes over the signal condition of the outputs of said NOT-AND gates as a position of 1-out-of-$(n+2)$ positions.

A slightly different form consists in that if $(n+1)$ AND gates are used as input gates of a group the multiplet circuit is formed by NOT-OR gates.

Figure 2:
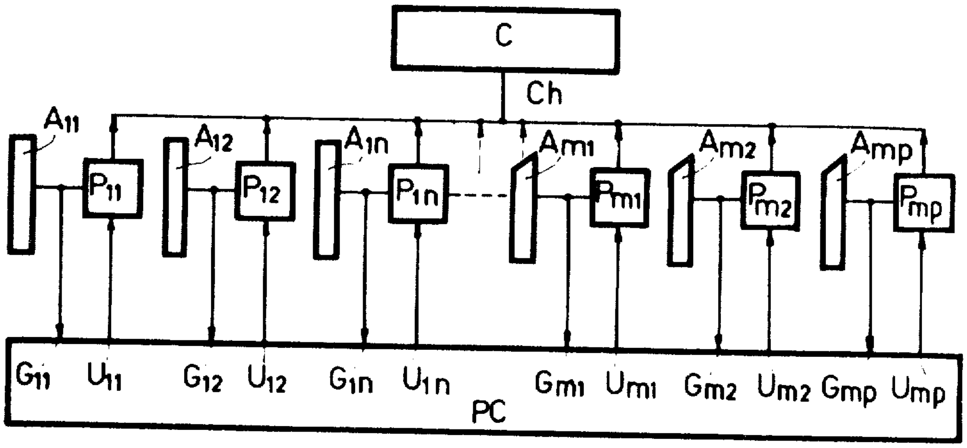
Figure 4:
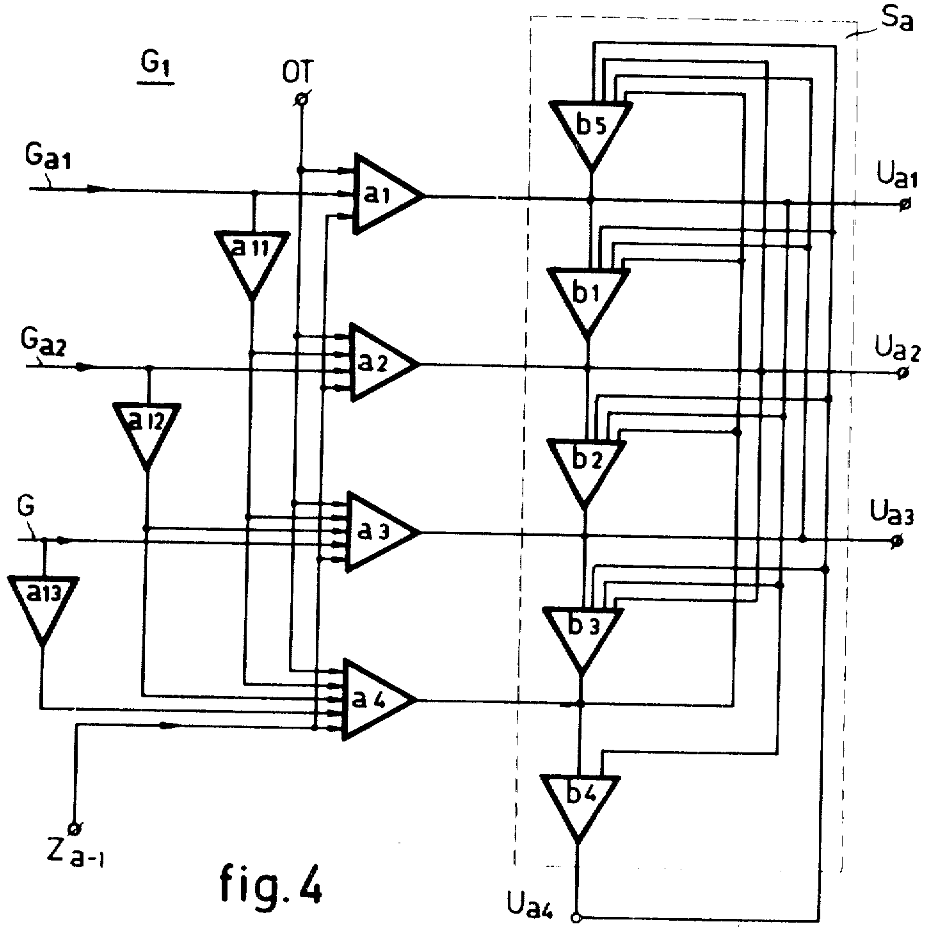
Figure 3:
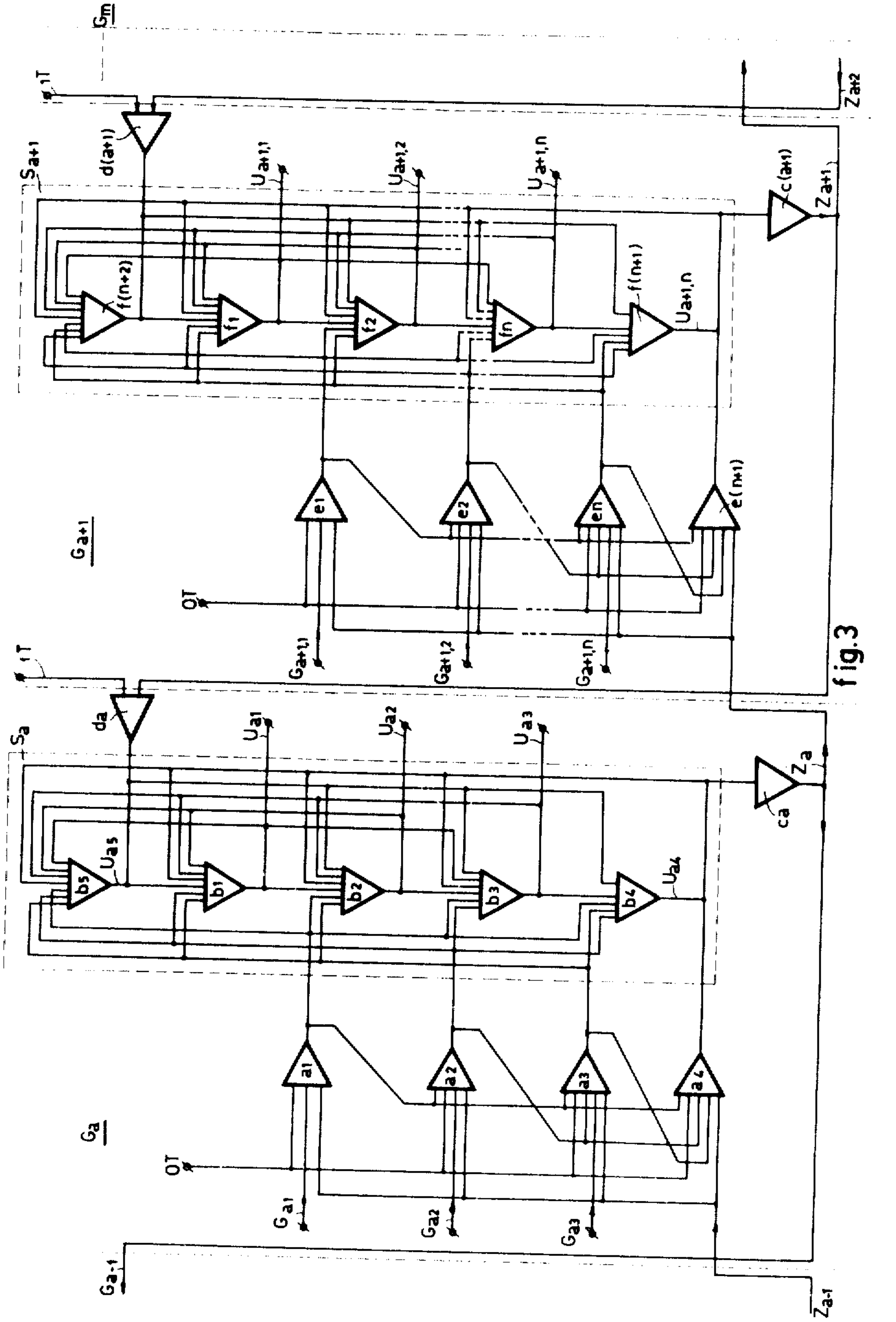

The invention will be described more fully with reference to the drawing in which, FIG. 1 is a first embodiment of a priority circuit according to the invention, FIG. 2 is an example of a device in which the priority circuit according to the invention can be employed, FIG. 3 is a further embodiment of a priority circuit according to the invention and FIG. 4 is a slightly different embodiment of the circuit of FIG. 3.

For the sake of simplicity FIG. 1 shows three groups $G_1$, $G_2$ and $G_3$ having each three interrogation lines $G_{11}$, $G_{12}$, $G_{13}$, $G_{21}$, $G_{22}$, $G_{23}$ and $G_{31}$, $G_{32}$ and $G_{33}$ respectively, at which interrogation signals may appear. The priority circuit shown forms a ring in which the groups $G_1$, $G_2$, $G_3$, $G_1$, etc., have their turn cyclically, whilst the interrogation signals are dealt with in accordance with the priority in the group. In a group $G_j$ an interrogation line $G_{j1}$ has priority over $G_{j2}$; $G_{j2}$ has priority over $G_{j3}$ ($j$=1, 2 or 3). For this purpose the interrogation line $G_{11}$ of group $G_1$ is connected to an AND-gate 11 and through an inverter 11*a* to AND-gates 12, 13 and 14; the interrogation line $G_{12}$ is connected to the AND-gate 12 and through an inverter 12*a* to the AND-gates 13 and 14, whereas the interrogation line 13 is connected to the AND-gate 13 and through an inverter 13*a* to the AND-gate 14. In a similar manner the groups $G_2$ and $G_3$ are arranged, which comprise the AND-gates 21...24 and 31...34 and the inverters 21*a*...23*a* and 31*a*...33*a*. Said AND-gates 14, 24 and 34 are the aforesaid additional AND gates provided for each group. The output of a preceding group is connected to all AND gates of a group; an input of the AND-gates 11...14 of the group $G_1$ is connected to the output $Z_3$ of the group $G_3$ preceding (in the ring) the group $G_1$. An input of the AND-gates 21...24 of group $G_2$ is connected to the output $Z_1$ of the preceding group $G_1$. An input of the AND-gates 31...34 of group $G_3$ is connected to the output $Z_2$ of the preceding group $G_2$. Each group comprises a 1-out-of-(n+2) position device $S_1$, $S_2$ and $S_3$ respectively. In this case n=3 so that each group has a 1-out-of-5 position device. In this example a 1-out-of-5 position device $S_1$ is formed by five flip-flops. The group $G_1$ comprises the flip-flops $FF_{11}$, $FF_{12}$...$FF_{15}$, the group $G_2$ the flip-flops $FF_{21}$...$FF_{25}$ and the group $G_3$ the flip-flops $FF_{31}$...$FF_{35}$. The flip-flops $FF_{j1}$ to $FF_{j4}$ are connected at their set input to the output of the respective AND-gates *j*1 to *j*4. The set input of the (*j*+5)th flip-flop $FF_{j5}$ is connected to the output of the next following group. Thus: flip-flop $FF_{15}$ is connected to the output $Z_2$ of group $G_2$, flip-flop $FF_{25}$ is connected to the output $Z_3$ of the group $G_3$ and flip-flop $FF_{35}$ is connected to the output $Z_1$ of group $G_1$.

In order to operate as a 1-out-of-5 position device the outputs $U_{11}$, $U_{12}$, $U_{13}$, $U_{14}$, $U_{15}$ of the flip-flops $FF_{11}$...$FF_{15}$ are connected to reset inputs $r_{11}$, $r_{12}$...$r_{15}$ of each other. The same applies to the outputs $U_{21}$...$U_{25}$ and $U_{31}$...$U_{35}$ of the respective flip-flops $FF_{21}$...$FF_{25}$ and $FF_{31}$...$F_{35}$ with their reset inputs $r_{21}$...$r_{25}$ and $r_{35}$ respectively.

The operation is as follows. It is assumed that a signal present at a line represents a "1" value and a signal not present represents a "0" value. It is assumed that interrogation signals "1" appear at the lines $G_{11}$ and $G_{13}$ of group $G_1$ and the output $Z_3$ of group $G_3$ has a signal "1" (more detail hereinafter). In this case the AND-gate 11 is opened and provides a "1" signal at the set input of flip-flop $FF_{11}$. The AND-gate 13 remains closed despite the "1" signal at $Z_3$ and the line $G_{13}$ because from the inverter 11a this gate receives a "0" signal, which is the inverse of the "1" signal at line $G_{11}$. The flip-flop $FF_{11}$ thus gets into the "1" state, which becomes manifest by a "1" signal at its output $U_{11}$. Any "1" state of a further flip-flop of the group resulting from a previous treatment is erased from the output $U_{11}$ of the flip-flop $FF_{11}$ via a corresponding reset input $r_{11}$ ($i \neq 1$) of the other flip-flop.

In this example during the treatment of an interrogation, in this case an interrogation due to the signal at line $G_{11}$, this interrogation signal has to remain available, since otherwise the interrogation signal of the line $G_{13}$ will influence the process. With reference to FIG. 3 it will be described that conditions may be different. When in this example the interrogation for which the line $G_{11}$ conveys the signal "1" is answered, this "1" signal disappears. If, as assumed, the line $G_{12}$ does not pass a "1" signal, but the line $G_{13}$ does, the gate 13 is opened and the flip-flop $FF_{13}$ is set. The output $U_{13}$ receives the "1" signal and the flip-flop $FF_{11}$, which was still in the "1" state, is reset to "0" via a reset input $r_{11}$ from $U_{13}$. In this way interrogations are accomplished within one group in accordance with priority. If during the processing of an interrogation along line $G_{13}$ an interrogation signal is received across $G_{11}$ or $G_{12}$, the interrogation from $G_{13}$ is first interrupted in this example and the interrogation of higher priority is first dealt with. The above applies in a corresponding manner to the other groups $G_{j+1}$, when they are activated via the output $Z_j$ of the preceding group. If, for example, in group $G_1$ all interrogations are answered to, the AND-gate 14 is opened because all "0" signals of lines $G_{11}$...$G_{13}$ via their inverters 11a...13a together with the "1" signal of line $Z_3$ have a "1" value at the inputs of this AND-gate 14. This means that flip-flop $FF_{14}$ gets into the "1" state and "1" state of a further flip-flop in the group is reset to "0" via the output $U_{14}$ through one of the reset inputs. Thus the line $Z_1$ has a "1" signal. This "1" signal passes to the next group, in this case $G_2$, which can then be activated. At the same time the "1" signal of the line $Z_1$ is also applied to the input of the (n+2)th=5th flip-flop $FF_{35}$ of the preceding group, in this case $G_3$. The flip-flop $FF_{35}$ gets into the "1" state and across its output $U_{35}$ the flip-flop FF $_{34}$, which was still in the "1" state, (it provided so far across the line $Z_3$ a "1" signal for activating the group $G_1$) is reset into the "0" state. Thus the group $G_3$ is in the rest position and the line $Z_3$ has a "0" signal, whereas the group $G_1$ is in the lowest priority position ($FF_{14}$ is in the "1" state), from where group $G_2$ is activated via the line $Z_1$.

Then interrogations in group $G_2$ are dealt with etc. If in the meantime interrogations are received in group $G_1$ or group $G_3$, they are not dealt with because these groups are not activated via the line $Z_3$ or $Z_2$ respectively. Not until have all interrogations of group $G_2$ been dealt with, the line $Z_2$ will have a "1" signal, so that the group $G_3$ is activated, whereas the group $G_1$ gets into the rest position by means of the flip-flop $FF_{15}$. In this way all groups have their turn in cyclic order of succession so that no inadmissible waiting times will occur for groups far remote from the first group.

FIG. 2 illustrates schematically how a priority circuit PC according to the invention may be arranged in a system. $A_{11}$, $A_{12}$....$A_{1n}$..$A_{m1}$, $A_{m2}$...$A_{mp}$ are peripheral apparatus which may ask a communication with a computer C. When an interrogation $A_{ij}$ comes in, a signal appears at the line $G_{ij}$ concerned, connected to the priority circuit PC. The peripheral apparatus are connected to a gate $P_{ij}$ ($P_{11}$, $P_{12}$...$P_{1n}$...$P_{m1}$, $P_{m2}$...$P_{mp}$). When the apparatus $A_{ij}$ is released for a communication with the computer C, a release signal is applied to the relevant gate $P_{ij}$ via the output $U_{ij}$ of the priority circuit PC. Via this gate the peripheral apparatus $A_{ij}$ is connected via a channel Ch, which is common to all peripheral apparatus, to the computer C.

FIG. 3 shows an embodiment of a priority circuit embodying the invention, which is formed as a whole of NOT-AND gates. It is indicated at the same time that the control of the circuit as a whole can be performed from a control part (not shown) of a computer through the lines OT and 1T. The construction from groups $G_{n-1}$, $G_n$ and $G_{n+1}$.... $G_m$ and different number of lines in each group $G_{al}$....$G_{a3}$; $G_{a+1,1}$...$G_{a+1,n}$ is practically similar to that shown in FIG. 1, where the AND gates are replaced by NOT-AND gates *a*1, *a*2,...*a*4...; *e*1.....*en* and the (n+2) NOT-AND gates *b*1, *b*2.....*b*5.....*f*1, *f*2.....*f*(n+1), *f*(n+2). The inverters 11a etc., may be omitted by using the output signals of the NOT-AND gate associated with a given interrogation signal. There are added the inverters formed by the NOT-AND-gates ....*ca*, *c*(*a*+1),... There are furthermore the NOT-AND-gates ...*da*, *d*(*a*+1)... which have both a 1T line and the output ...$Z_{a+1}$, $Z_{a+2}$,...of a next group as inputs.

The operation is mainly the same as that of the priority circuit of FIG. 1, be it that the multiplets formed by the series combination of NOT-AND-gates *b*1, *b*2,....*b*5 and $f_1$,...*f*(n+2) respectively have a slightly different operation than the flip-flops: if an interrogation signal "1" is present on the line $G_{a2}$ and not at the same time on the line $G_{a1}$ and if the group $G_a$ can be activated by a "1" signal from the line $Z_{a-1}$ of the preceding group and a command "1" is received from the control part (not shown) via the line OT, the NOT-AND-gate *a*2 will provide a "0" signal at the output. The other NOT-AND-gates *a*1, *a*3 and *a*4 have a "1" signal at the outputs. For the multiplet having the NOT-AND-gates *b*1,...*b*5 this means that: *b*1 receives inter alia a "0" and a "1" signal from the NOT-AND-gate *a*2 and *a*3 respectively. This means that this NOT-AND-gate *b*1 has a "1" signal at its output $U_{a1}$. The same applies to the NOT-AND-gates *b*1, *b*4 and *b*5. Only the NOT-AND-gate *b*2 receives a "1" signal at all its inputs (the NOT-AND-gate *da* has also a "1" signal at its output because its inputs have a "0" signal) and has a "0" signal at the output $U_{a2}$. This "0" signal indicates the release of the interrogation receives via the line $G_{a2}$. The interrogation signal of the line $G_{a2}$ need not remain present during the process because the command "1" from the line OT reappears only after the accomplishment of the whole interrogation or, as the case may be, a partial interrogation (to be interrupted at a suitable point), in order to apply any other interrogation signal or the same interrogation signal to the NOT-AND-gates *a*1... *a*4. When the group $G_{a+1}$ gets into the lowest priority position, that is to say, when the output $U_{a+1,n}$ of the NOT-AND-gate *f*(n+1) has a "0" signal, this "0" signal of the NOT-AND-gate *f*(n+1), subsequent to inversion in the NOT-AND-gate *c*(*a*+1) is applied as a "1" signal along the line $Z_{a+1}$ to the next following group $G_{a+2}$ for activating the same when a "1" signal is given via OT. At the same time this "1" signal is applied through the line $Z_{a+1}$ to the NOT-AND-gate *da* of the preceding group $G_a$. When from the line 1T a command "1" is received, this NOT-AND-gate *da* provides a "0" signal at its output. This "0" signal is applied to the (*n*+2)th input of the multiplet, i.e., the output $U_{a5}$ of the NOT-AND-gate *b*5. This output $U_{a5}$ thus necessarily obtains a "0" signal and hence also all other outputs $U_{a1}$....$U_{a4}$ have a "1" signal. Thus the rest position of the multiplied is obtained and it is ready for operation when a "1" signal comes in through the line $Z_{a-1}$ and a further "1" signal through the line OT.

FIG. 4 shows a variant of the embodiment of FIG. 3. As an example only one group $G_1$ is shown. This arrangement comprises as inverters the NOT-AND-gates (see FIG. 1) *a*11, *a*12, *a*13 for the formation of the inverted signals for the NOT-AND-gates *a*1, *a*2, *a*3 and *a*4. This has the advantage that outputs of the NOT-AND-gates *a*1...*a*4 can be directly "OR"-ed with the connections between the NOT-AND-gates *b*1, *b*2.....*b*5 of the 1-out-of-(*n*+2) multiplete so that (cf. FIG. 3) a number of inputs (diodes) are economized. It should be emphasized that other 1-out-of (*n*+2) position devices may be designed suitable for use in the arrangement according to the invention.

What is claimed is:

1. A computing device comprising a priority circuit for transferring one of a plurality of interrogation signals coming in from a number of lines in accordance with a given priority, in a cyclic order of succession while maintaining the priority in a group, said number of lines being arranged in a number of different groups of lines, in which each interrogation signal and the inverses thereof of higher priority in the group are applied in each group to first respective inputs of a logic (NOT)-AND gate, a further respective input of each said logic (NOT)-AND gate in the group connected to the output of the preceding group, each group including an additional (NOT)-AND gate, one input of which is connected to said output of the preceding group and further inputs of which are connected to terminal means for providing the inverses of the interrogation signals, one of said groups including the output of each (NOT)-AND gate associated therewith connected to an input of a (*n*+1) inputs of a 1-out-of-(*n*+2) position device, wherein *n* is the number of lines in one group, and means connecting the (*n*+2)th input of the 1-out-of-(*n*+2) position device of one group to the output of the next following group for blocking said one group from interrogation signals during adjustment of a reset position.

2. A priority circuit as claimed in claim 1 wherein said 1-out-of-(*n*+2) position device includes a (*n*+2) (NOT)-AND gates, the outputs of said (NOT)-AND gates, receiving the interrogation signals and their inverses, being connected to the inputs of the multiplet so that the multiplet takes over the signal condition of the outputs of the said (NOT)-AND gates as a position of the 1-out-of-(*n*+2) position device.

3. A priority circuit as claimed in claim 2 wherein in the case of (*n*+1) AND gates as input gates of a group the multiplet circuit includes (NOT)-OR gates.

* * * * *